Aug. 7, 1951  H. HAMPSON ET AL  2,563,111
FLEXIBLE VENEER AND PROCESS FOR MAKING SAME
Filed Sept. 2, 1950
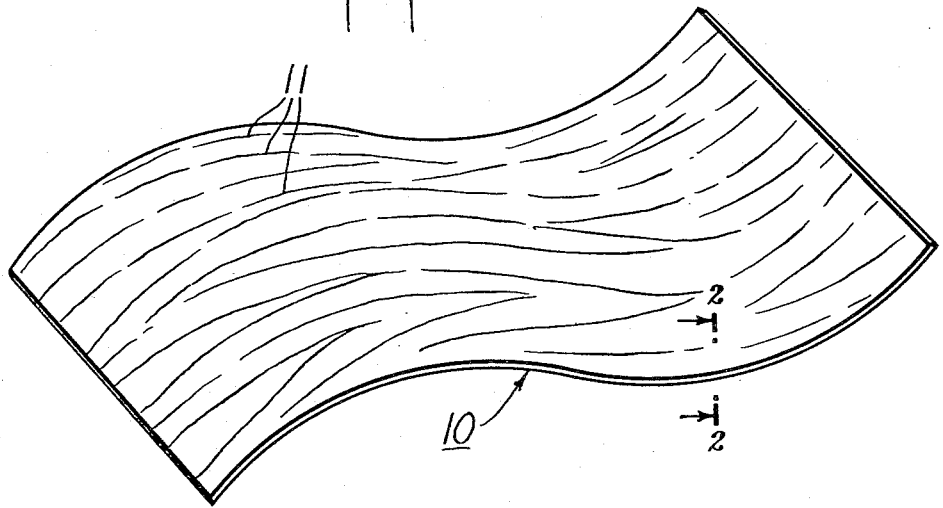
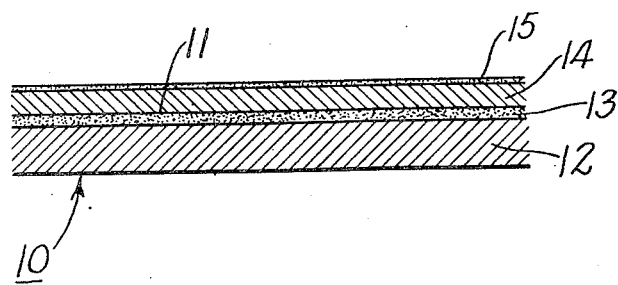
INVENTORS
Herbert Hampson
Paul Quinn
BY
Joseph V. Meigs
ATTORNEY Patented Aug. 7, 1951

2,563,111

UNITED STATES PATENT OFFICE 2,563,111

FLEXIBLE VENEER AND PROCESS FOR MAKING SAME

Herbert Hampson, West Englewood, and Paul Quinn, East Paterson, N. J., assignors to General Coated Products, Inc., Paterson, N. J., a corporation of New Jersey Application September 2, 1950, Serial No. 182,908

9 Claims. (Cl. 154—121)

This invention relates to a flexible laminated product adapted for use as a veneer or as a decorative surface coating for walls, tables, desks, counters, doors, partitions, and numerous other structures and articles.

While laminated resin-impregnated fibrous materials such as paper have been made to provide products which may be decorative, abrasion resistant and resistant to the action of greases, solvents and so on, such products have heretofore been subject to an intrinsic disadvantage in that pliability has not been attained concomitant with the other qualities desired. This has resulted in limiting the use of such laminates.

It is an object of this invention to overcome the disadvantages of the products previously known in this art.

An object of this invention is to produce a veneer product having, inter alia, the following features:

The pliability is so high that the product can be readily applied to a variety of surfaces including not only plane surfaces but also those having curved and other geometrical configurations. Notwithstanding that pliability the product has a surface possessing the hardness, smoothness, abrasion resistance and other desirable properties normally obtainable only with the rigid or non-pliable resin or resinoid-impregnated laminates. This combination of properties, plus low cost of production, provides a new material having a broad field of utility for example as surfacing and resurfacing material.

A further object is to produce a product having not only the above mentioned properties but which also may have a printed decorative design or coloring clearly visible on one side but nevertheless protected from abrasion, solvents and other deteriorating influences met with in the use thereof.

Still other objects of this invention will be clear from the following description.

In accordance with the invention a flexible laminated paper product is made which comprises a thin overlay sheet impregnated with a thermoset resin which is abrasion-resistant and solvent-resistant in the heat-set condition and which is color-stable in changing from the fusible to the infusible condition. The resins now known which answer these criteria are melamine aldehyde resin and diallyl phthalate resins, although other resins which may exist or become known and respond to said criteria are included in the invention. To the overlay sheet is bonded a relatively thicker back sheet impregnated with a cured rubbery polymerizate or elastomer which is compatible with the cured or thermoset resin so that proper cohesion occurs at the interface of the overlay and the back sheets by the application of pressure and heat. The elastomers now known which answer these criteria are natural rubber, chloro-2-butadiene-1,3 polymers commonly known as neoprene and butadiene-styrene copolymers commonly known as GRS although other elastomers which may exist or become known and respond to said criteria are included in the invention. By controlling the thickness of the overlay sheet the inherent hardness, inertness and abrasion resistance of the heat-set resins with which the overlay sheet is impregnated are maintained while securing a flexibility of the overlay sheet comparable with that of the much thicker backing sheet so that a product is obtained having the flexibility of the rubbery polymers combined with the surface hardness and other desirable qualities of the heat-set resins.

The principles of the invention will be defined in the claims and illustrated by specific examples and the accompanying drawing in which Fig. 1 is a partial perspective view of a composite laminate made in accordance with this invention, wherein is particularly shown the flexible quality of the laminate;

Fig. 2 is an enlarged sectional view of the laminate shown in Fig. 1 taken along the line 2—2 thereof.

More particularly in the drawings the composite laminate 10 is shown as having a decorative wood-grain design 11 on its underside and visible through overlay sheet 14. Laminate 10 is shown as made up of a back sheet 12 impregnated in accordance with the invention and having a surface coating of pigment 13 on its upper surface. Bonded to back sheet 12 is a thin resin-impregnated overlay sheet 14; overlay sheet 14 is shown as having on its upper surface a thin film of resin 15 which assists in providing protection of the design 11 from abrasive action.

*Example 1*

A top or overlay sheet made of a transparent rayon base or high alpha cellulose paper (about 0.003–0.008" thickness) is printed on one surface with a decorative design for example a simulated mahogany grain. The overlay sheet is treated wtih a dispersion of melamine-aldehyde resin in water or alcohol or mixtures thereof so that the impregnated paper contains about 75–50 per cent. by weight of resin, the higher proportion of resin being used with the thinner paper and conversely. The impregnated sheet is then dried to remove the water or alcohol or mixtures thereof.

In making the back sheet an aqueous dispersion (latex) of neoprene (chloro 2-butadiene-1,3 polymer) used, for example a commercial neoprene latex containing about 70% polymer by weight. This is diluted to contain about 30% of polymer by weight and there is incorporated therewith about 7 to 10% by weight of zinc oxide as a curing agent and about 1% by weight of a suitable accelerator e. g. mercapto benzo thiazole, the proportions of zinc oxide and accelerator being based on the weight of the polymer.

A good quality of saturating paper having a thickness of 0.020 inch to 0.050 inch, preferably 0.025 inch is impregnated with the above dispersion until the paper contains 20 to 30 per cent preferably about 25 per cent of its weight of the chloro-2, butadiene-1,3 polymer. The impregnated product is then passed through a hot air chamber and exposed to a temperature and for a time sufficient to remove the water and volatile material and cure the polymer e. g. 320° F. for about 2 to 3 minutes. Then the back sheet is coated on one side to the extent of about 2 ounces per square yard with known pigments such as titanium oxide (white) or cadmium pigments (reds and yellows) to bring out the decorative design in the finished laminate more effectively. The pigments are dispersed in a binder medium compatible with the resin and elastomer, and preferably in an aqueous melamine resin dispersion and the sheet is again dried to remove water.

The overlay and back sheets are then pressed together so that the surface-coated side of the back sheet is in contact with the printed side of the overlay sheet. The pressing of the two sheets together is done at a pressure ranging from 150 pounds per square inch to as high as about 1500 pounds per square inch; the temperature during pressing is maintained at about 300° F. The pressing operation is maintained for at least 3 minutes' duration, with a 6 minutes' pressing preferred. The resulting laminate is smooth, clean, attractive, abrasion-resistant and flexible. For example, the laminate may be rolled into a one inch cylinder (and even smaller) without impairing the laminate.

Example 2

Proceed as in Example 1 except that the back sheet is impregnated with natural rubber by using for example a natural rubber latex containing about 30% by weight of rubber solids and incorporating therewith about 7 to 10% by weight of zinc oxide and 5% by weight of sulfur (in colloidal form) based on the rubber content of the latex, together with a suitable accelerator.

Example 3

Proceed as in Example 2 except that the latex contains about 30% by weight of GRS (butadiene-styrene copolymer).

Example 4

Proceed according to any of Examples 1, 2 and 3 except that, instead of using a melamine-aldehyde resin for impregnation of the overlay sheet diallyl phthalate (e. g. a solution thereof in acetone containing about 50% diallyl phthalate by weight together with a polymerization catalyst such as butyl peroxide or other organic peroxide) is employed and the overlay sheet is impregnated with about 50 to 75% of its weight of the diallyl phthalate and pressing of the overlay sheet in contact with the backing sheet is continued for at least about 15 minutes.

While we have indicated that the back sheet should be surface-coated with a suitable pigment, this step may be omitted in some instances, for example, when the top sheet is not printed with a design. Likewise, this invention is not limited to overlay sheets made of rayon-base or high alpha cellulose papers; in general any paper or fibrous material which is relatively transparent and which will absorb the requisite amount of resin is suitable.

In using a laminate embodying this invention, the product may be applied to a base surface such as a wall, sink top, counter top, door, cabinet, etc. by conventional fastening agents. Thus, the laminate may be nailed, tacked, stapled or glued to an appropriate surface. When applying the laminate to a surface by gluing, we have had good results using a neoprene-base adhesive; depending on the ultimate use this may be applied hot or cold. Neoprene-base adhesives are particularly suitable when the laminate is to be fastened to a metallic surface.

While the presently preferred embodiments of this invention have been described in some detail, the invention is not limited to the specific embodiments described as it will be apparent to those skilled in the art that the invention may be practiced in various ways within the spirit and scope of the appended claims.

Having now particularly described our invention what we claim is:

1. A pliable, flexible laminate comprising a thin overlay sheet of paper having a thickness of about 0.003 to 0.008 inch impregnated with about 75 to 50 per cent. by weight of a heat-set resin of the group consisting of melamine aldehyde resins and diallyl phthalate resins, and laminated thereto a relatively thick backing sheet of flexible fibrous material having a thickness of 0.020 to 0.050 inch impregnated with 20 to 30 per cent. by weight of a cured rubbery polymerizate of the group consisting of chloro-2, butadiene-1,3 polymers, butadiene-styrene copolymers and natural rubber.

2. Product according to claim 1 in which the overlay sheet is printed with a decorative design on the surface in contact with the backing sheet and the backing sheet has a coating of pigment on the surface in contact with the overlay sheet.

3 Product according to claim 1 in which the overlay sheet is impregnated with a heat-set melamine-aldehyde resin.

4. Product according to claim 1 in which the overlay sheet is impregnated with polymerized diallyl phthalate.

5. Product according to claim 1 in which the backing sheet is impregnated with a cured chloro-2, butadiene-1,3 polymer.

6. Product according to claim 1 in which the backing sheet is impregnated with a cured butadiene-styrene copolymer.

7. Product according to claim 1 in which the backing sheet is impregnated with cured natural rubber.

8. The process of making a pliable, flexible laminate having a hard, smooth, wear-resistant surface which comprises impregnating a thin sheet of paper having a thickness of about 0.003 to 0.008 inch with about 75 to 50 per cent, by weight of thermo-setting resin of the group consisting of melamine-aldehyde resins and diallyl phthalate resins, impregnating a relatively thick sheet of paper having a thickness of about 0.025 inch with 20 to 30 per cent. by weight of a cured rubbery polymerizate of the group consisting of chloro-2, butadiene-1,3 polymers, butadiene-styrene copolymer and natural rubber and laminating the two sheets together by the application of heat and pressure to cause union thereof by coherence of a resin on a surface of the thin sheet with a rubbery polymerizate on the adjacent surface of the thick sheet.

9. The process of making a pliable, flexible laminate having a hard, smooth surface, resistant to abrasion, heat, and numerous sources of stain such as solvents, foods, soaps, washing powders, etc. which comprises impregnating a thin sheet of paper having a thickness of about 0.003 to 0.008 inch with about 75 to 50 per cent. by weight of a fusible, heat-setting resin of the group consisting of melamine-aldehyde resins and diallyl phthalate resins, impregnating a relatively thick paper sheet having a thickness of about 0.025 inch with 20 to 30 per cent. by weight of an uncured rubbery polymerizate of the group consisting of chloro-2, butadiene-1,3 polymers, butadiene-styrene copolymers and natural rubber and then curing said polymerizate by heating the impregnated relatively thick sheet, and then laminating the thick and thin sheets together by subjecting them to pressure and heat to convert the resin from the fusible to the heat-set condition and cause coherence of the resin on a surface of the resin-impregnated sheet with the cured rubbery polymer on the adjacent surface of the relatively thick sheet.

HERBERT HAMPSON.
PAUL QUINN.

REFERENCES CITED

The following references are of record in the file of this patent:

UNITED STATES PATENTS

| Number | Name | Date |
| --- | --- | --- |
| 1,863,239 | Cochrane | June 14, 1932 |
| 1,905,749 | Richter et al. | Apr. 25, 1933 |
| 1,956,314 | Carter | Apr. 24, 1934 |
| 2,062,088 | Dreyer | Nov. 24, 1936 |
| 2,278,777 | Garvey et al. | Apr. 7, 1942 |
| 2,442,083 | Hall et al. | May 25, 1948 |
| 2,496,665 | Hermanson | Feb. 7, 1950 |